US012087310B2

(12) United States Patent
Borsum et al.

(10) Patent No.: US 12,087,310 B2
(45) **Date of Patent: *Sep. 10, 2024**

(54) APPARATUS AND METHOD FOR PROVIDING ENHANCED GUIDED DOWNMIX CAPABILITIES FOR 3D AUDIO

(71) Applicant: Fraunhofer-Gesellschaft zur Foerderung der angewandten Forschung e.V., Munich (DE)

(72) Inventors: Arne Borsum, Erlangen (DE); Stephan Schreiner, Birgland (DE); Harald Fuchs, Roettenbach (DE); Michael Kratz, Erlangen (DE); Bernhard Grill, Lauf (DE); Sebastian Scharrer, Hersbruck (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 159 days.

This patent is subject to a terminal disclaimer.

(21) Appl. No.: 17/148,638

(22) Filed: Jan. 14, 2021

(65) Prior Publication Data

US 2021/0134304 A1 May 6, 2021

Related U.S. Application Data

(63) Continuation of application No. 16/429,280, filed on Jun. 3, 2019, now Pat. No. 10,950,246, which is a (Continued)

(51) Int. Cl.
*G10L 19/008* (2013.01)
*G10L 19/02* (2013.01)
(Continued)

(52) U.S. Cl.
CPC ............ *G10L 19/008* (2013.01); *G10L 19/02* (2013.01); *G10L 19/173* (2013.01); *H04S 3/002* (2013.01);
(Continued)

(58) Field of Classification Search
None
See application file for complete search history.

(56) References Cited

U.S. PATENT DOCUMENTS 9,179,236 B2 * 11/2015 Robinson ................ H04S 3/008
9,653,084 B2 * 5/2017 Borsum .................. H04S 3/002
(Continued)

OTHER PUBLICATIONS

Borsum et al., "Apparatus and Method for Providing Enhanced Guided Downmix Capabilities for 3D Audio", U.S. Appl. No. 16/429,280, filed Jun. 3, 2019.

*Primary Examiner* — Douglas Godbold
(74) *Attorney, Agent, or Firm* — Keating & Bennett, LLP

(57) ABSTRACT

An apparatus for downmixing three or more audio input channels to obtain two or more audio output channels is provided. The apparatus includes a receiving interface for receiving the three or more audio input channels and for receiving side information. Moreover, the apparatus includes a downmixer for downmixing the three or more audio input channels depending on the side information to obtain the two or more audio output channels. The number of the audio output channels is smaller than the number of the audio input channels. The side information indicates a characteristic of at least one of the three or more audio input channels, or a characteristic of one or more sound waves recorded within the one or more audio input channels, or a characteristic of one or more sound sources which emitted one or more sound waves recorded within the one or more audio input channels.

15 Claims, 9 Drawing Sheets

Related U.S. Application Data continuation of application No. 15/595,065, filed on May 15, 2017, now Pat. No. 10,347,259, which is a continuation of application No. 14/643,007, filed on Mar. 10, 2015, now Pat. No. 9,653,084, which is a continuation of application No. PCT/EP2013/068903, filed on Sep. 12, 2013.

(60) Provisional application No. 61/699,990, filed on Sep. 12, 2012.

(51) Int. Cl.

| | |
|---|---|
| ***G10L 19/16*** | (2013.01) |
| ***H04S 3/00*** | (2006.01) |
| ***H04S 3/02*** | (2006.01) |
| ***H04S 5/00*** | (2006.01) |

(52) U.S. Cl.

CPC ................ *H04S 3/02* (2013.01); *H04S 5/005* (2013.01); *H04S 2400/03* (2013.01); *H04S 2400/11* (2013.01); *H04S 2420/03* (2013.01)

(56) References Cited

U.S. PATENT DOCUMENTS

| | | | | | |
|---|---|---|---|---|---|
| 10,347,259 | B2* | 7/2019 | Borsum | G10L 19/02 | |
| 2006/0262936 | A1* | 11/2006 | Sato | H04S 3/02 | 381/22 |
| 2007/0127733 | A1* | 6/2007 | Henn | G10L 19/008 | 381/80 |
| 2007/0269063 | A1* | 11/2007 | Goodwin | G10L 19/008 | 381/310 |
| 2008/0232617 | A1* | 9/2008 | Goodwin | G10L 19/008 | 381/119 |
| 2008/0298612 | A1* | 12/2008 | Kulkarni | H04S 5/00 | 381/27 |
| 2010/0014680 | A1* | 1/2010 | Oh | G10L 19/008 | 381/23 |
| 2010/0166191 | A1* | 7/2010 | Herre | G10L 19/173 | 381/1 |
| 2010/0232619 | A1* | 9/2010 | Uhle | G10L 21/0364 | 381/119 |
| 2011/0013790 | A1* | 1/2011 | Hilpert | G10L 19/008 | 381/1 |
| 2011/0202357 | A1* | 8/2011 | Kim | G10L 19/008 | 704/500 |
| 2012/0114126 | A1* | 5/2012 | Thiergart | G10L 21/0272 | 381/17 |
| 2012/0121091 | A1* | 5/2012 | Ojanpera | G10L 19/008 | 381/1 |
| 2012/0201389 | A1* | 8/2012 | Emerit | H04S 1/002 | 381/23 |
| 2012/0230497 | A1* | 9/2012 | Dressler | G10L 19/008 | 381/22 |
| 2014/0016802 | A1* | 1/2014 | Sen | H04S 3/002 | 381/307 |
| 2015/0117650 | A1* | 4/2015 | Jo | H04S 7/302 | 381/17 |

* cited by examiner

APPARATUS AND METHOD FOR PROVIDING ENHANCED GUIDED DOWNMIX CAPABILITIES FOR 3D AUDIO

CROSS-REFERENCE TO RELATED APPLICATIONS

This application is a continuation of copending U.S. patent application Ser. No. 16/429,280, filed Jun. 3, 2019, which in turn is a continuation of copending U.S. patent application Ser. No. 15/595,065, filed May 15, 2017, which is a continuation of copending U.S. patent application Ser. No. 14/643,007, filed Mar. 10, 2015, which is a continuation of copending International Application No. PCT/EP2013/068903, filed Sep. 12, 2013, which is incorporated herein by reference in its entirety, and additionally claims priority from U.S. Application No. 61/699,990, filed Sep. 12, 2012, which is also incorporated herein by reference in its entirety.

BACKGROUND OF THE INVENTION

The present invention relates to audio signal processing, and, in particular, to an apparatus and a method for realizing an enhanced downmix, in particular, for realizing enhanced guided downmix capabilities for 3D audio.

An increasing number of loudspeakers is used for a spatial reproduction of sound. While legacy surround sound reproduction (e.g. 5.1) was limited to a single plane, new channel formats with elevated speakers have been introduced in the context of 3D audio reproduction.

The signals to be reproduced over the loudspeakers used to be directly related to the particular speakers and were stored and transmitted discretely or parametrically. It can be said that for this kind of formats, that they are related to a clearly defined number and position of loudspeakers of the sound reproduction system. Accordingly, it is necessitated to consider a particular reproduction format before transmission or storage of an audio signal.

Nevertheless, there are already some exceptions from this principle. For example, multi-channel audio signals (e.g. five surround audio channels or e.g., 5.1 surround audio channels) have to be down-mixed for reproduction over two-channel stereo loudspeaker setups. Rules exist how to reproduce five surround channels on two loudspeakers of a stereo system.

Moreover, when stereo channels were introduced, a rule existed how to reproduce the audio content of the two stereo channels by a single mono loudspeaker.

Since the number of formats and thus the possibilities how loudspeakers are positioned have increased, it will be nearly impossible to consider the loudspeaker setup of the reproduction system before transmission or storage. Accordingly, it will be necessitated to adapt the incoming audio signals to the actual loudspeaker setup.

Different methods can be used for downmixing from surround sound to two-channel stereo. The still widely used time-domain downmix with static downmix coefficients is often referred to as ITU downmix [5]. Other time-domain downmixing approaches—partly with dynamic adjustment of the downmix coefficients—are employed in the encoders of matrix surround techniques [6], [7].

In [3], it is disclosed that direct sound sources mixed to the rear channels folded-down into the two-channel stereo panorama might not be distinguishable due to masking or otherwise mask other sound sources.

In the course of the development of spatial audio coding (SAC) technologies, frequency-selective downmix algorithms were introduced as part of the encoder [8], [9]. Particularly, sound colorizations can be reduced and the level balancing and stability of sound source localization is maintained by applying energy equalization to the resulting audio channels. Energy equalization is also performed in other downmixing systems [9], [10], [12].

For the case that the rear channels only contain ambient sound like reverberance, the reduction of ambience (reverberance, spaciousness) is solved in the ITU downmix [5] by attenuating the rear channels of the multi-channel signal. If rear channels also contain direct sound, this attenuation is not appropriate since direct parts of the rear channel would be attenuated as well in the downmix. Therefore, a more sophisticated ambience attenuation algorithm is appreciated.

Audio codecs like AC-3 and HE-AAC provide means to transmit so-called metadata alongside the audio stream, including downmixing coefficients for the downmix from five to two audio channels (stereo). The amount of selected audio channels (center, rear channels) in the resulting stereo signal is controlled by transmitted gain values. Although these coefficients can be time-variant they remain usually constant for the duration of one item of a program.

The solution used in the "Logic7" matrix system introduced a signal adaptive approach which attenuates the rear channels only if they are considered to be fully ambient. This is achieved by comparing the power of the front channels to the power of the rear channels. The assumption of this approach is that if the rear channels solely contain ambience, they have significantly less power than the front channels. The more power the front channels have compared to the rear channels, the more the rear channels are attenuated in the downmixing process. This assumption may be true for some surround productions especially with classical content but this assumption is not true for various other signals.

It would therefore be highly appreciated, if improved concepts for audio signal processing would be provided.

SUMMARY

According to an embodiment, an apparatus for generating two or more audio output channels from three or more audio input channels may have: a receiving interface for receiving the three or more audio input channels and for receiving side information, and a downmixer for downmixing the three or more audio input channels depending on the side information to obtain the two or more audio output channels, wherein the number of the audio output channels is smaller than the number of the audio input channels, and wherein the side information indicates a characteristic of at least one of the three or more audio input channels, or a characteristic of one or more sound waves recorded within the one or more audio input channels, or a characteristic of one or more sound sources which emitted one or more sound waves recorded within the one or more audio input channels.

According to another embodiment, a system may have: an encoder for encoding three or more unprocessed audio channels to obtain three or more encoded audio channels, and for encoding additional information on the three or more unprocessed audio channels to obtain side information, and an apparatus according to one of the preceding claims for receiving the three or more encoded audio channels as three or more audio input channels, for receiving the side information, and for generating, depending on the side information, two or more audio output channels from the three or more audio input channels.

According to another embodiment, a method for generating two or more audio output channels from three or more audio input channels may have the steps of: receiving the three or more audio input channels and receiving side information, and downmixing the three or more audio input channels depending on the side information to obtain the two or more audio output channels, wherein the number of the audio output channels is smaller than the number of the audio input channels, and wherein the side information indicates a characteristic of at least one of the three or more audio input channels, or a characteristic of one or more sound waves recorded within the one or more audio input channels, or a characteristic of one or more sound sources which emitted one or more sound waves recorded within the one or more audio input channels.

Another embodiment may have a computer program for implementing the inventive method when being executed on a computer or signal processor.

An apparatus for generating two or more audio output channels from three or more audio input channels is provided. The apparatus comprises a receiving interface for receiving the three or more audio input channels and for receiving side information. Moreover, the apparatus comprises a downmixer for downmixing the three or more audio input channels depending on the side information to obtain the two or more audio output channels. The number of the audio output channels is smaller than the number of the audio input channels. The side information indicates a characteristic of at least one of the three or more audio input channels, or a characteristic of one or more sound waves recorded within the one or more audio input channels, or a characteristic of one or more sound sources which emitted one or more sound waves recorded within the one or more audio input channels.

Embodiments are based on the concept to transmit side-information alongside the audio signals to guide the process of format conversion from the format of the incoming audio signal to the format of the reproduction system.

According to an embodiment, the downmixer may be configured to generate each audio output channel of the two or more audio output channels by modifying at least two audio input channels of the three or more audio input channels depending on the side information to obtain a group of modified audio channels, and by combining each modified audio channel of said group of modified audio channels to obtain said audio output channel.

In an embodiment, the downmixer may, for example, be configured to generate each audio output channel of the two or more audio output channels by modifying each audio input channel of the three or more audio input channels depending on the side information to obtain the group of modified audio channels, and by combining each modified audio channel of said group of modified audio channels to obtain said audio output channel.

According to an embodiment, the downmixer may, for example, be configured to generate each audio output channel of the two or more audio output channels by generating each modified audio channel of the group of modified audio channels by determining a weight depending on an audio input channel of the one or more audio input channels and depending on the side information and by applying said weight on said audio input channel.

In an embodiment, the side information may indicate an amount of ambience of each of the three or more audio input channels. The downmixer may be configured to downmix the three or more audio input channels depending on the amount of ambience of each of the three or more audio input channels to obtain the two or more audio output channels.

According to another embodiment, the side information may indicate a diffuseness of each of the three or more audio input channels or a directivity of each of the three or more audio input channels. The downmixer may be configured to downmix the three or more audio input channels depending on the diffuseness of each of the three or more audio input channels or depending on the directivity of each of the three or more audio input channels to obtain the two or more audio output channels.

In a further embodiment, the side information may indicate a direction of arrival of the sound. The downmixer may be configured to downmix the three or more audio input channels depending on the direction of arrival of the sound to obtain the two or more audio output channels. In an embodiment, each of the two or more audio output channels may be a loudspeaker channel for steering a loudspeaker.

According to an embodiment, the apparatus may be configured to feed each of the two or more audio output channels into a loudspeaker of a group of two or more loudspeakers. The downmixer may be configured to downmix the three or more audio input channels depending on each assumed loudspeaker position of a first group of three or more assumed loudspeaker positions and depending on each actual loudspeaker position of a second group of two or more actual loudspeaker positions to obtain the two or more audio output channels. Each actual loudspeaker position of the second group of two or more actual loudspeaker positions may indicate a position of a loudspeaker of the group of two or more loudspeakers.

In an embodiment, each audio input channel of the three or more audio input channels may be assigned to an assumed loudspeaker position of the first group of three or more assumed loudspeaker positions. Each audio output channel of the two or more audio output channels may be assigned to an actual loudspeaker position of the second group of two or more actual loudspeaker positions. The downmixer may be configured to generate each audio output channel of the two or more audio output channels depending on at least two of the three or more audio input channels, depending on the assumed loudspeaker position of each of said at least two of the three or more audio input channels and depending on the actual loudspeaker position of said audio output channel.

According to an embodiment, each of the three or more audio input channels comprises an audio signal of an audio object of three or more audio objects. The side information comprises, for each audio object of the three or more audio objects, an audio object position indicating a position of said audio object. The downmixer is configured to downmix the three or more audio input channels depending on the audio object position of each of the three or more audio objects to obtain the two or more audio output channels.

In an embodiment, the downmixer is configured to downmix four or more audio input channels depending on the side information to obtain three or more audio output channels.

Moreover, a system is provided. The system comprises an encoder for encoding three or more unprocessed audio channels to obtain three or more encoded audio channels, and for encoding additional information on the three or more unprocessed audio channels to obtain side information. Furthermore, the system comprises an apparatus according to one of the above-described embodiments for receiving the three or more encoded audio channels as three or more audio input channels, for receiving the side information, and for generating, depending on the side information, two or more audio output channels from the three or more audio input channels.

Moreover, a method for generating two or more audio output channels from three or more audio input channels is provided. The method comprises:

Receiving the three or more audio input channels and receiving side information. And:

Downmixing the three or more audio input channels depending on the side information to obtain the two or more audio output channels.

The number of the audio output channels is smaller than the number of the audio input channels. The audio input channels comprise a recording of sound emitted by a sound source, and wherein the side information indicates a characteristic of the sound or a characteristic of the sound source.

Moreover, a computer program for implementing the above-described method when being executed on a computer or signal processor is provided.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
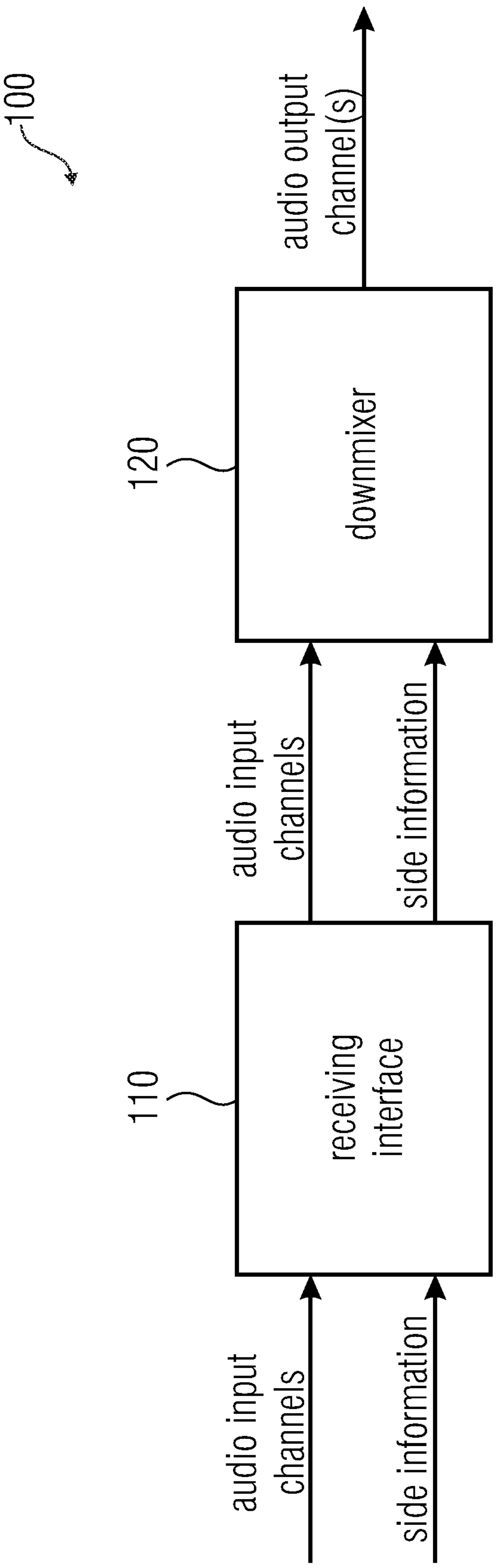
FIG. 1 is an apparatus for downmixing three or more audio input channels to obtain two or more audio output channels according to an embodiment.

FIG. 1 illustrates an apparatus 100 for generating two or more audio output channels from three or more audio input channels according to an embodiment.

The apparatus 100 comprises a receiving interface 110 for receiving the three or more audio input channels and for receiving side information.

Moreover, the apparatus 100 comprises a downmixer 120 for downmixing the three or more audio input channels depending on the side information to obtain the two or more audio output channels.

The number of the audio output channels is smaller than the number of the audio input channels. The side information indicates a characteristic of at least one of the three or more audio input channels, or a characteristic of one or more sound waves recorded within the one or more audio input channels, or a characteristic of one or more sound sources which emitted one or more sound waves recorded within the one or more audio input channels.

Figure 2:
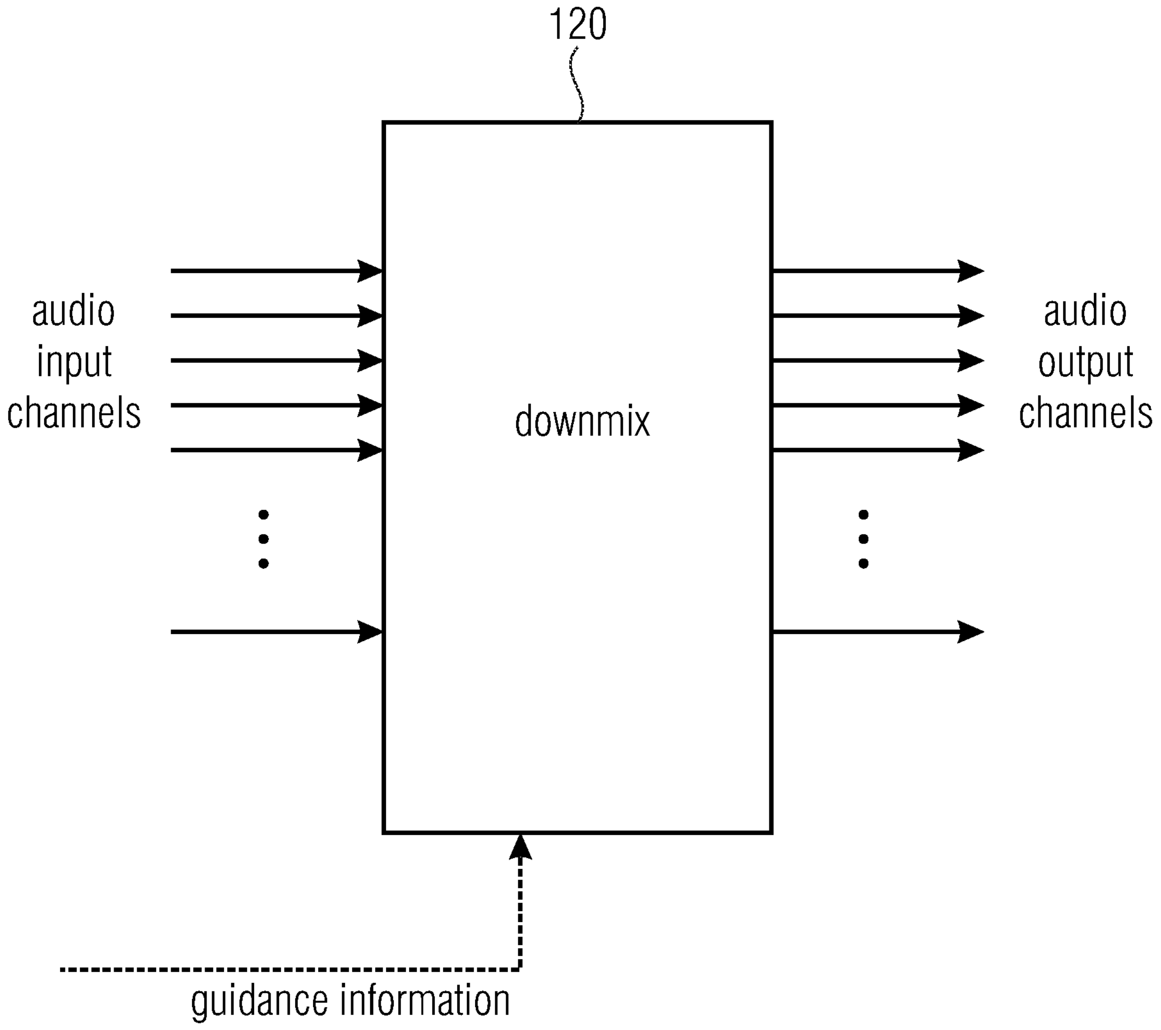
FIG. 2 illustrates a downmixer according to an embodiment.

FIG. 2 depicts a downmixer 120 according to an embodiment in a further illustration. The guidance information illustrated in FIG. 2 is side information.

Figure 7:
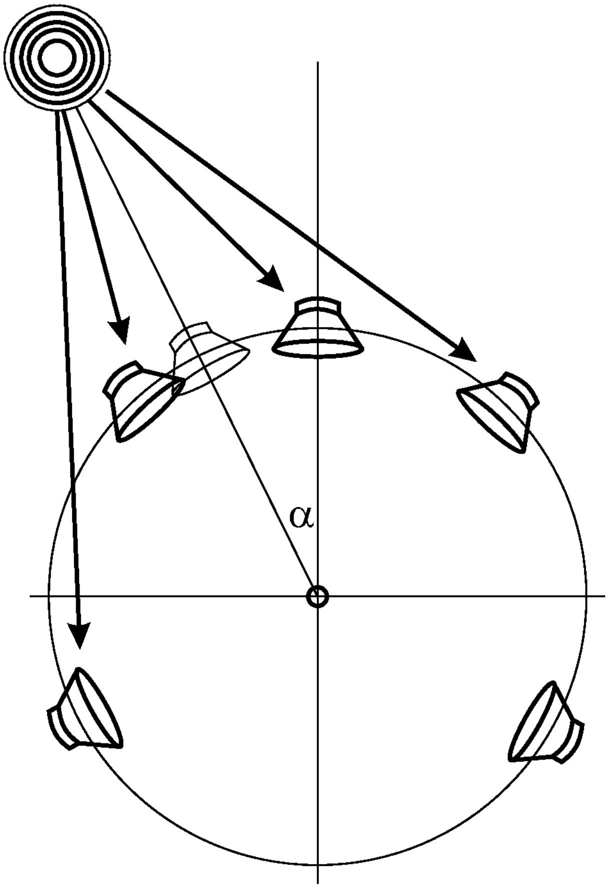
FIG. 7 illustrates such a rendering of a source signal for different loudspeaker positions.

FIG. 7 illustrates a rendering of a source signal for different loudspeaker positions. The rendering transfer functions may be dependent on angles (azimuth and elevation), e.g., indicating a direction of arrival of a sound wave, may be dependent on a distance, e.g., a distance from a sound source to a recording microphone, and/or may be dependent on a diffuseness, wherein these parameters may, e.g., be frequency-dependent.

In contrast to blind downmix approaches, e.g., unguided downmixing approaches, according to embodiments, control data or descriptive information will be transmitted alongside the audio signal to take influence on the downmixing process at the receiver side of the signal chain. This side information may be calculated at the sender/encoder side of the signal chain or may be provided from user input. The side information can for example be transmitted in a bitstream, e.g., multiplexed with an encoded audio signal.

According to a particular embodiment, the downmixer 120 may, for example, be configured to downmix four or more audio input channels depending on the side information to obtain three or more audio output channels.

In an embodiment, each of the two or more audio output channels may, e.g., be a loudspeaker channel for steering a loudspeaker.

For example, in a particular further embodiment, the downmixer 120 may be configured to downmix seven audio input channels to obtain three or more audio output channels. In another particular embodiment, the downmixer 120 may be configured to downmix nine audio input channels to obtain three or more audio output channels. In a particular further embodiment, the downmixer 120 may be configured to downmix 24 channels to obtain three or more audio output channels.

In another particular embodiment, the downmixer 120 may be configured to downmix seven or more audio input channels to obtain exactly five audio output channels, e.g. to obtain five audio channels of a five channel surround system. In a further particular embodiment, the downmixer 120 may be configured to downmix seven or more audio input channels to obtain exactly six audio output channels, e.g., six audio channels of a 5.1 surround system.

According to an embodiment, the downmixer may be configured to generate each audio output channel of the two or more audio output channels by modifying at least two audio input channels of the three or more audio input channels depending on the side information to obtain a group of modified audio channels, and by combining each modified audio channel of said group of modified audio channels to obtain said audio output channel.

In an embodiment, the downmixer may, for example, be configured to generate each audio output channel of the two or more audio output channels by modifying each audio input channel of the three or more audio input channels depending on the side information to obtain the group of modified audio channels, and by combining each modified audio channel of said group of modified audio channels to obtain said audio output channel.

According to an embodiment, the downmixer 120 may, for example, be configured to generate each audio output channel of the two or more audio output channels by generating each modified audio channel of the group of modified audio channels by determining a weight depending on an audio input channel of the one or more audio input channels and depending on the side information and by applying said weight on said audio input channel.

Figure 3:
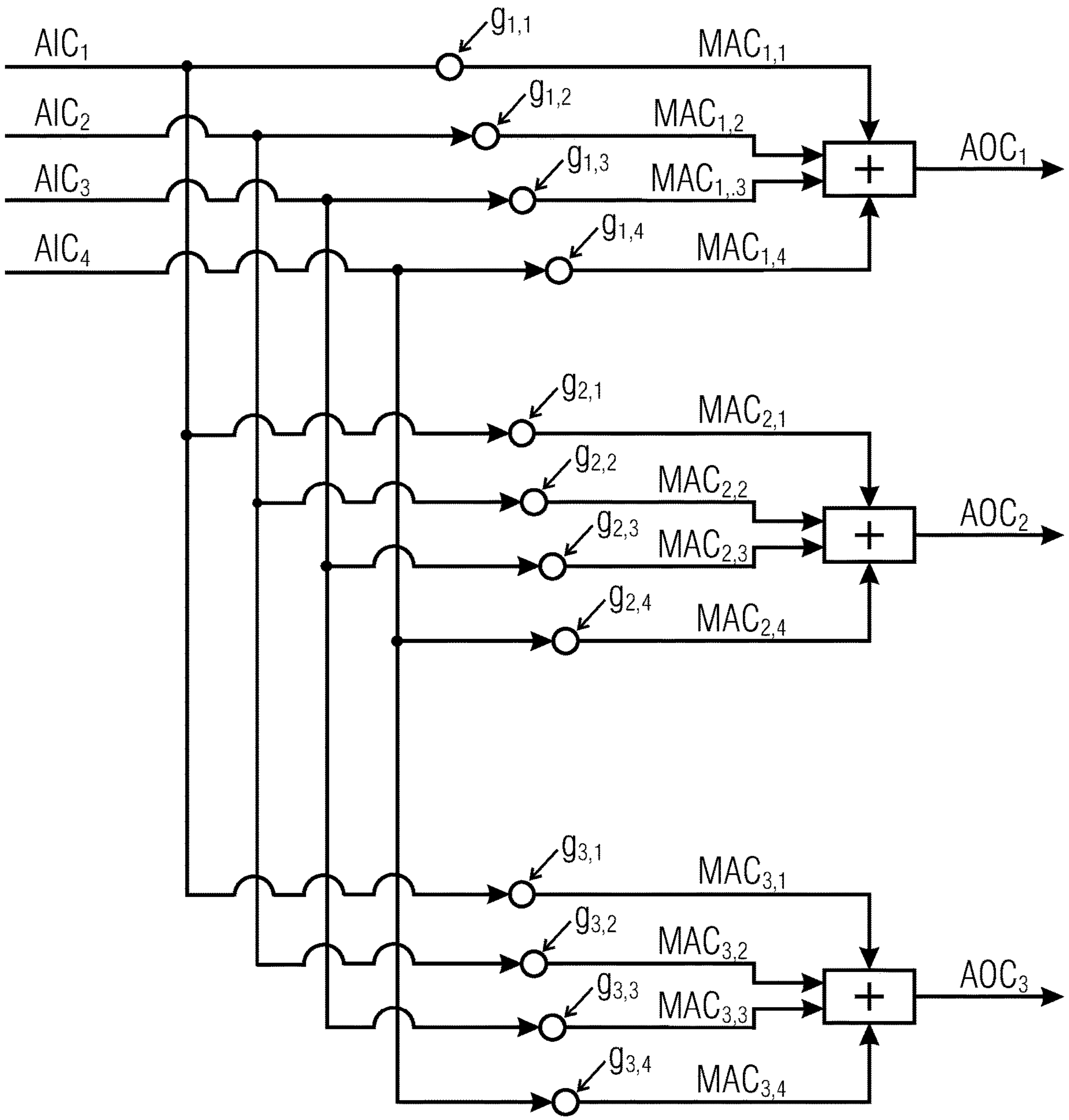
FIG. 3 illustrates a scenario according to an embodiment, wherein each of the audio output channels is generated depending on each of the audio input channels.

FIG. 3 illustrates such an embodiment. Each audio output channel ($AOC_1$, $AOC_2$, $AOC_3$) depending on each of the audio input channels ($AIC_1$, $AIC_2$, $AIC_3$, $AIC_4$).

For example, the first audio output channel $AOC_1$ is considered.

The downmixer 120 is configured to determine a weight $g_{1,1}$, $g_{1,2}$, $g_{1,3}$, $g_{1,4}$ for each audio input channel $AIC_1$, $AIC_2$, $AIC_3$, $AIC_4$ depending on the audio input channel and depending on the side information. Moreover, the downmixer 120 is configured to apply each weight $g_{1,1}$, $g_{1,2}$, $g_{1,3}$ $g_{1,4}$ on its audio input channel $AIC_1$, $AIC_2$, $AIC_3$, $AIC_4$.

For example, the downmixer may be configured to apply a weight on its audio input channel by multiplying each time domain sample of the audio input channel by the weight (e.g., when the audio input channel is represented in a time domain). Or, for example, the downmixer may be configured to apply a weight on its audio input channel by multiplying each spectral value of the audio input channel by the weight (e.g., when the audio input channel is represented in a spectral domain, frequency domain or time-frequency domain). The obtained modified audio channels ($MAC_{1,1}$, $MAC_{1,2}$, $MAC_{1,3}$, $MAC_{1,4}$) resulting from applying weights $g_{1,1}$, $g_{1,2}$, $g_{1,3}$, $g_{1,4}$ are then combined, for example, added, to obtain one of the audio output channels $AOC_1$.

The second audio output channel $AOC_2$ determined analogously by determining weights $g_{2,1}$, $g_{2,2}$, $g_{2,3}$, $g_{2,4}$, by applying each of the weights on its audio input channel $AIC_1$, $AIC_2$, $AIC_3$, $AIC_4$, and by combining the resulting modified audio channels $MAC_{2,1}$, $MAC_{2,2}$, $MAC_{2,3}$, $MAC_{2,4}$.

Likewise, the third audio output channel $AOC_2$ determined analogously by determining weights $g_{3,1}$, $g_{3,2}$, $g_{3,3}$, $g_{3,4}$, by applying each of the weights on its audio input channel $AIC_1$, $AIC_2$, $AIC_3$, $AIC_4$, and by combining the resulting modified audio channels $MAC_{3,1}$, $MAC_{3,2}$, $MAC_{3,3}$, $MAC_{3,4}$.

Figure 4:
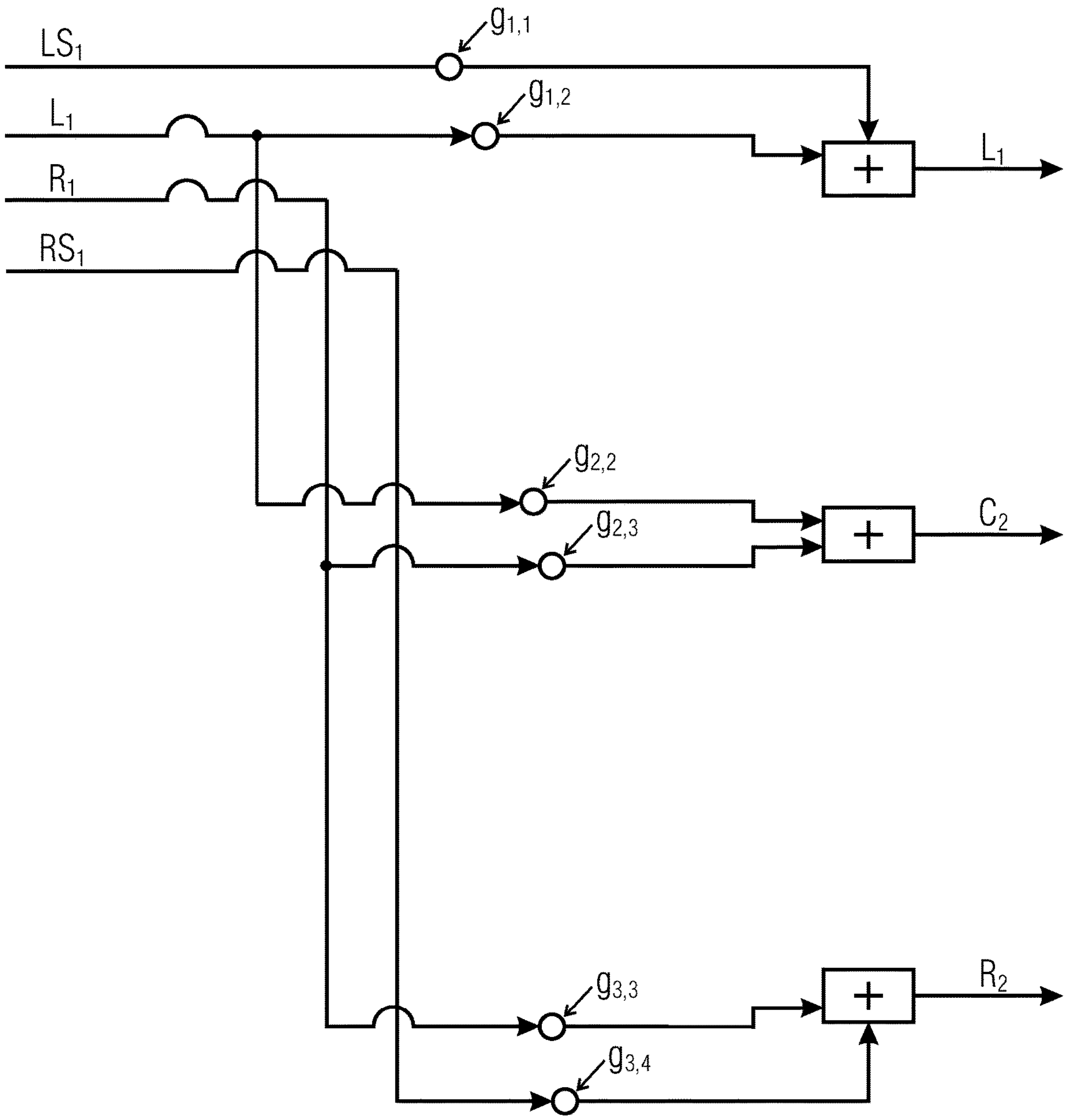
FIG. 4 illustrates another scenario according to an embodiment, wherein each of the audio output channels is generated depending on exactly two of the audio input channels.

FIG. 4 illustrates an embodiment, wherein each of the audio output channels is not generated by modifying each audio input channel of the three or more audio input channels, but wherein each of the audio output channels is generated by modifying only two of the audio input channels and by combining these two audio input channels.

For example, in FIG. 4, four channels are received as audio input channels ($LS_1$=left surround input channel; $L_1$=left input channel; $R_1$=right input channel; $RS_1$=right surround input channel) and three audio output channels shall be generated ($L_2$=left output channel; $R_2$=right output channel; $C_2$=center output channel) by downmixing the audio input channels.

In FIG. 4, the left output channel $L_2$ is generated depending on the left surround input channel $LS_1$ and depending on the left input channel $L_1$. For this purpose, the downmixer 120 generates a weight $g_{1,1}$ for the left surround input channel $LS_1$ depending on the side information and generates a weight $g_{1,2}$ for the left input channel $L_1$ depending on the side information and applies each of the weights on its audio input channel to obtain the left output channel $L_2$.

Moreover, the center output channel $C_2$ is generated depending on the left input channel $L_1$ and depending on the right input channel $R_1$. For this purpose, the downmixer 120 generates a weight $g_{2,2}$ for the left input channel $L_1$ depending on the side information and generates a weight $g_{2,3}$ for the right input channel $R_1$ depending on the side information and applies each of the weights on its audio input channel to obtain the center output channel $C_2$.

Furthermore, the right output channel $R_2$ is generated depending on the right input channel $R_1$ and depending on the right surround input channel $RS_1$. For this purpose, the downmixer 120 generates a weight $g_{3,3}$ for the right input channel $R_1$ depending on the side information and generates a weight $g_{3,4}$ for the right surround input channel $RS_1$ depending on the side information and applies each of the weights on its audio input channel to obtain the left output channel $R_2$.

Embodiments of the present invention are motivated by the following findings:

The state of the art provides downmixing coefficients as metadata in the bitstream.

One approach would be to extend the state of the art by frequency-selective downmixing coefficients, additional channels (e.g., audio channels, of the original channel configuration, e.g. height information) and/or additional formats to be used in the target channel configuration. In other words, the downmix matrix for 3D audio formats should be extended by the additional channels of the input format, in particular by height channels of the 3D audio formats. Regarding the additional formats, a multitude of output formats should be supported by 3D audio. While with a 5.0 or a 5.1 signal, a downmix can be effected only on stereo or possibly mono, with channel configurations comprising a larger number of channels one has to take into account that several output formats are relevant. With 22.2 channels, these might be mono, stereo, 5.1 or different 7.1 variants, etc.

However, the expected bitrates for the transmission of these extended coefficients would increase significantly. For particular formats, it may be reasonable to define additional downmixing coefficients and to combine them with the existing downmixing metadata (see 7.1 proposal to MPEG, output document N12980).

In the context of 3D audio, the expected combinations of channel configurations on the sender and receiver side are numerous and the amount of data will go beyond the acceptable bitrates. Nevertheless, redundance reduction (e.g. huffman coding) might reduce the amount of data to an acceptable proportion.

Moreover, the downmixing coefficients as described above may be characterized parametrically.

However, still, the expected bitrates would nevertheless be significantly increased by such an approach.

From the above, it follows, that generally it is not practicable to extend established approaches, one reason being that as a consequence, the data rates would become disproportionately high.

A generic downmix specification in the time domain may be formulated as follows:

$$y_n(t)=c_{nm}\cdot x_m(t),$$

wherein y(t) is the output signal of a downmix, x(t) is the input signal, n is the index of the input audio channel, m is the index of the output channel. The downmix coefficient of the $m^{th}$ input channel on the $n^{th}$ output channel corresponds to $c_{nm}$. A known example is the downmix of a 5-channel signal and a 2-channel stereo signal with:

$$L'(t)=L(t)+c_C\cdot C(t)+c_R\cdot LS(t)$$

$$R'(t)=R(t)+c_C\cdot C(t)+c_R\cdot RS(t)$$

The downmix coefficients are static and are applied to each sample of the audio signal. They may be added as meta data to the audio bitstream. The term “frequency-selective downmix coefficients” is used in reference to the possibility of utilizing separate downmix coefficients for specific frequency bands. In combination with time-varying coefficients, the decoder-side downmix may be controlled from the encoder. The downmix specification for an audio frame then becomes:

$$y_n(k,s)=c_{nm}(k)\cdot x_m(k,s),$$

wherein k is the frequency band (e.g. hybrid QMF band), s is the subsamples of a hybrid QMF band.

As is described above, transmission of these coefficients would result in high bit rates.

Embodiments of the present invention provide employ descriptive side information. The downmixer 120 is configured to downmix the three or more audio input channels depending on such (descriptive) side information to obtain the two or more audio output channels.

Descriptive information on audio channels, combination of audio channels or audio objects may improve the downmixing process since characteristics of the audio signals can be considered.

In general such side information indicates a characteristic of at least one of the three or more audio input channels, or a characteristic of one or more sound waves recorded within the one or more audio input channels, or a characteristic of one or more sound sources which emitted one or more sound waves recorded within the one or more audio input channels.

Examples for side information may be one or more of the following parameters:

Dry/wet ratio
Amount of ambience
Diffuseness
Directivity
Sound source width
Sound source distance
Direction of arrival Definitions of these parameters are well-known for a person skilled in the art. Definitions for these parameters can be found in the accompanying literature (see [1]-[24]). For example, a definition for the amount of ambience is provided in [15], [16], [17], [18], [19] and [14]. The definition for the dry/wet ratio can be immediately derived from the definition for direct/ambience, as it is well-known by the person skilled in the art. The terms directivity and diffuseness are explained in [21] and are also well-known by the person skilled in the art.

The suggested parameters are provided as side information to guide the rendering process generating an N-channel output signal from an M-channel input signal where—in the case of downmixing—N is smaller than M.

The parameters which are provided as side information are not necessarily constant. Instead, the parameters may vary over time (the parameters may be time-variant).

In general, the side information may comprise parameters which are available in a frequency selective manner.

Application of the transmitted side information is performed in decoder-side post processing/rendering. Evaluation of the parameters and their weighting is dependent on the target channel configuration and further rendition-side characteristics.

The parameters mentioned may relate to channels, groups of channels, or objects.

The parameters may be used in a downmix process so as to determine the weighting of a channel or object during downmixing by the downmixer 120.

As an example: If a height channel contains exclusively reverberation and/or reflections, it might have a negative effect on the sound quality during downmixing. In this case, its share in the audio channel resulting from the downmix should therefore be small. When controlling the downmixing, a high value of the "amount of ambience" parameter would therefore result in low downmix coefficients for this channel. By contrast, if it contains direct signals, it should be reflected to a larger extent in the audio channel resulting from the downmix and therefore result in higher downmix coefficients (in a higher weight).

For example, height channels of a 3D audio production may contain direct signal components as well as reflections and reverb for the purpose of envelopment. If these height channels are mixed with the channels of the horizontal plane, the latter may result will be undesired in the resulting mix while the foreground audio content of the direct components should be downmixed by their full amount.

The information may be used to adjust the downmixing coefficients (where appropriate in a frequency-selective manner). This remark applies to all the above parameters mentioned. Frequency selectivity may enable finer control of the downmixing.

For example, the weight which is applied on an audio input channel to obtain a modified audio channel may be determined accordingly depending on the respective side information.

For example, if foreground channels (e.g. a left, center or right channel of a surround system) shall be generated as audio output channels, and not background channels (such as a left surround channel or a right surround channel of a surround system), then:

If the side information indicates that the amount of ambience of an audio input channel is high, then a small weight for this audio input channel may be determined for generating the foreground audio output channel. By this, the modified audio channel resulting from this audio input channel is only slightly taken into account for generating the respective audio output channel.

If the side information indicates that the amount of ambience of an audio input channel is low, then a greater weight for this audio input channel may be determined for generating the foreground audio output channel. By this, the modified audio channel resulting from this audio input channel is largely taken into account for generating the respective audio output channel.

In an embodiment, the side information may indicate an amount of ambience of each of the three or more audio input channels. The downmixer may be configured to downmix the three or more audio input channels depending on the amount of ambience of each of the three or more audio input channels to obtain the two or more audio output channels.

For example, the side information may comprise a parameter specifying an amount of ambience for each audio input channel of the three or more audio input channels. E.g., each audio input channel may comprise ambient signal portions and/or direct signal portions. For example, the amount of ambience of an audio input channel may be specified as a real number $a_i$, wherein i indicates one of the three or more audio input channels, and wherein $a_i$ might, for example, be in the range $0\le a_i\le 1$. $a_i=0$ may indicate that the respective audio input channel comprises no ambient signal portions. $a_i=1$ may indicate that the respective audio input channel comprises only ambient signal portions. In general, an amount of ambience of an audio input channel may, e.g., indicate an amount of ambient signal portions within the audio input channel.

For example, returning to FIG. 3, in an embodiment, it might be decided that ambient signal portions are undesired. A corresponding downmixer 120 may determine the weights of FIG. 3, for example, according to the formula:

$$g_{c,i}=(1-a_i)/4 \text{ wherein } c\in\{1,2,3\};\ i\in\{1,2,3,4\};\ 0\le a_i\le 1$$

In such an embodiment, all weights are determined equal for each of the three or more audio output channels.

However, for other embodiments, it may be decided, that for some audio output channels, ambience is more acceptable than for other audio output channels. For example, it may be decided, that in an embodiment according to FIG. 3, ambience is more acceptable for the first audio output channel $AOC_1$ and for the third audio output channel $AOC_3$ than for the second audio output channel $AOC_2$. Then, a corresponding downmixer 120 may determine the weights of FIG. 3, for example, according to the formula:

$$g_{1,i}=(1-(a_i/2))/4 \text{ wherein } i\in\{1,2,3,4\};\ 0\le a_i\le 1$$

$$g_{2,i}=(1-a_i)/4 \text{ wherein } i\in\{1,2,3,4\};\ 0\le a_i\le 1$$

$$g_{3,i}=(1-(a_i/2))/4 \text{ wherein } i\in\{1,2,3,4\};\ 0\le a_i\le 1$$

In such an embodiment, weights of one of the three or more audio output channels are determined differently from weights of another one of the three or more audio output channels.

The weights of FIG. 4 may be determined similarly as for the two examples described with respect to FIG. 3, for example, analogously to the first example, as:

$$g_{1,1}=(1-a_i)/2;\ g_{1,2}=(1-a_i)/2;\ g_{2,2}=(1-a_i)/2;$$

$$g_{2,3}=(1-a_i)/2;\ g_{3,3}=(1-a_i)/2;\ g_{3,4}=(1-a_i)/2;$$

The weights $g_{c,i}$ of FIG. 3 and FIG. 4 may also be determined in any other desired, suitable way.

According to another embodiment, the side information may indicate a diffuseness of each of the three or more audio input channels or a directivity of each of the three or more audio input channels. The downmixer may be configured to downmix the three or more audio input channels depending on the diffuseness of each of the three or more audio input channels or depending on the directivity of each of the three or more audio input channels to obtain the two or more audio output channels.

In such an embodiment, the side information may, for example, comprise a parameter specifying the diffuseness for each audio input channel of the three or more audio input channels. E.g., each audio input channel may comprise diffuse signal portions and/or direct signal portions. For example, the diffuseness of an audio input channel may be specified as a real number $d_i$, wherein i indicates one of the three or more audio input channels, and wherein $d_i$ might, for example, be in the range $0\le d_i\le 1$. $d_i=0$ may indicate that the respective audio input channel comprises no diffuse signal portions. $d_i=1$ may indicate that the respective audio input channel comprises only diffuse signal portions. In general, a diffuseness of an audio input channel may, e.g., indicate an amount of diffuse signal portions within the audio input channel.

The weights $g_{c,i}$ may be determined in the example of FIG. 3, for example, as $$g_{c,i}=(1-d_i)/4 \text{ wherein } c\in\{1,2,3\};\ i\in\{1,2,3,4\};\ 0\le d_i\le 1$$

or, for example, as $$g_{1,i}=(1-(d_i/2))/4 \text{ wherein } i\in\{1,2,3,4\}:\ 0\le d_i\le 1$$

$$g_{2,i}=(1-d_i)/4 \text{ wherein } i\in\{1,2,3,4\};\ 0\le d_i\le 1$$

$$g_{3,i}=(1-(d_i/2))/4 \text{ wherein } i\in\{1,2,3,4\};\ 0\le d_i\le 1$$

or in any other suitable, desired way.

Or, the side information may, for example, comprise a parameter specifying the directivity for each audio input channel of the three or more audio input channels. For example, the directivity of an audio input channel may be specified as a real number $d_i$, wherein i indicates one of the three or more audio input channels, and wherein $d_i$ might, for example, be in the range $0\le dir_i\le 1$. $dir_i=0$ may indicate that the signal portions of the respective audio input channel have a low directivity. $dir_i=1$ may indicate that the signal portions of the respective audio input channel have a high directivity.

The weights $g_{c,i}$ may be determined in the example of FIG. 3, for example, as $$g_{c,i}=dir_i/4 \text{ wherein } c\in\{1,2,3\};\ i\in\{1,2,3,4\};\ 0\le dir_i\le 1$$

or, for example, as $$g_{1,i}=0{,}125+dir_i/8 \text{ wherein } i\in\{1,2,3,4\};\ 0\le dir_i\le 1$$

$$g_{2,i}=dir_i/4 \text{ wherein } i\in\{1,2,3,4\};\ 0\le dir_i\le 1$$

$$g_{3,i}=0{,}125+dir_i/8 \text{ wherein } i\in\{1,2,3,4\};\ 0\le dir_i\le 1$$

or in any other suitable, desired way.

In a further embodiment, the side information may indicate a direction of arrival of the sound. The downmixer may be configured to downmix the three or more audio input channels depending on the direction of arrival of the sound to obtain the two or more audio output channels.

For example, a direction of arrival, e.g., a direction of arrival of a sound wave. For example, the direction of arrival of a sound wave recorded by an audio input channel may be specified as may be specified as an angle $\varphi_i$, wherein I indicates one of the three or more audio input channels, wherein $\varphi_i$ might, e.g., be in the range $0°\le\varphi_i<360°$. For example, sound portions of sound waves having a direction of arrival close to 90° shall have a high weight and sound waves having a direction of arrival close to 270° shall have a low weight or shall have no weight in the audio output signal at all. The weights $g_{c,i}$ may be determined in the example of FIG. 3, for example, as $$g_{c,i}=(1+\sin\varphi_i)/8 \text{ wherein } c\in\{1,2,3\};\ i\in\{1,2,3,4\};\ 0°\le\varphi_i<360°$$

When a direction of arrival of 270° is more acceptable for audio output channels $AOC_1$ and $AOC_3$ than for audio output channel $AOC_2$, then, the weights $g_{c,i}$ may, for example, be determined as $$g_{1,i}=(1.5+(\sin\varphi_i)/2)/8 \text{ wherein } i\in\{1,2,3,4\};\ 0°\le\varphi_i<360°$$

$$g_{2,i}=(1+\sin\varphi_i)/8 \text{ wherein } i\in\{1,2,3,4\};\ 0°\le\varphi_i<360°$$

$$g_{3,i}=(1.5+(\sin\varphi_i)/2)/8 \text{ wherein } i\in\{1,2,3,4\};\ 0°\le\varphi_i<360°$$

or in any other suitable, desired way.

To realize the reproduction of audio signals for different loudspeaker settings by employing descriptive side information, for example, one or more of the following parameters may be employed:

- direction of arrival (horizontal and vertical)
- difference from listener
- width of the source ("diffuseness")

In particular with object-oriented 3D audio, these parameters may be employed for controlling mapping of an object to the loudspeakers of the target format.

Moreover, these parameters may, for example, be available in a frequency selective manner.

Value range of “diffuseness”: Point source—plane wave—omnidirectionally arriving wave. It should be noted that diffuseness may be different from ambience. (see, e.g., voices from nowhere in psychedelic feature films).

According to an embodiment, the apparatus 100 may be configured to feed each of the two or more audio output channels into a loudspeaker of a group of two or more loudspeakers. The downmixer 120 may be configured to downmix the three or more audio input channels depending on each assumed loudspeaker position of a first group of three or more assumed loudspeaker positions and depending on each actual loudspeaker position of a second group of two or more actual loudspeaker positions to obtain the two or more audio output channels. Each actual loudspeaker position of the second group of two or more actual loudspeaker positions may indicate a position of a loudspeaker of the group of two or more loudspeakers.

For example, an audio input channel may be assigned to an assumed loudspeaker position. Moreover, a first audio output channel is generated for a first loudspeaker at a first actual loudspeaker position, and a second audio output channel is generated for a second loudspeaker at a second actual loudspeaker position. If the distance between the first actual loudspeaker position and the assumed loudspeaker position is smaller than the distance between the second actual loudspeaker position and the assumed loudspeaker position, then, for example, the audio input channel influences the first audio output channel more than the second audio output channel.

For example, a first weight and a second weight may be generated. The first weight may depend on the distance between the first actual loudspeaker position and the assumed loudspeaker position. The second weight may depend on the distance between the second actual loudspeaker position and the assumed loudspeaker position. The first weight is greater than the second weight. For generating the first audio output channel, the first weight may be applied on the audio input channel to generate a first modified audio channel. For generating the second audio output channel, the second weight may be applied on the audio input channel to generate a second modified audio channel. Further modified audio channels may similarly be generated for the other audio output channels and/or for the other audio input channels, respectively. Each audio output channel of the two or more audio output channels may be generated by combining its modified audio channels.

Figure 5:
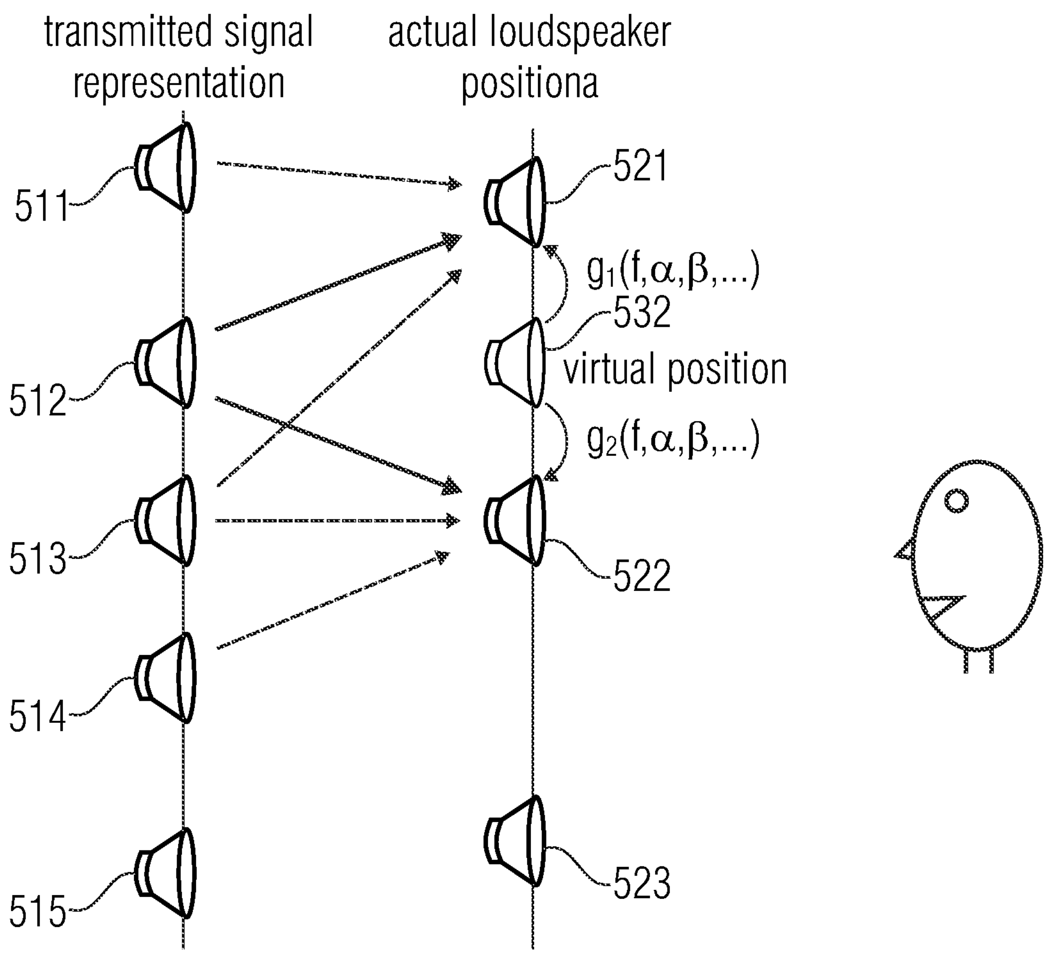
FIG. 5 illustrates a mapping of transmitted spatial representation signals on actual loudspeaker positions.

FIG. 5 illustrates such a mapping of transmitted spatial representation signals on actual loudspeaker positions. The assumed loudspeaker positions 511, 512, 513, 514 and 515 belong to the first group of assumed loudspeaker positions. The actual loudspeaker positions 521, 522 and 523 belong to the second group of actual loudspeaker positions.

For example, how an audio input channel for an assumed loudspeaker at an assumed loudspeaker position 512 influences a first audio output signal for a first real loudspeaker at a first actual loudspeaker position 521 and a second audio output signal for a second real loudspeaker at a second actual loudspeaker position 522, depends on how close the assumed position 512 (or its virtual position 532) is to the first actual loudspeaker position 521 and to the second actual loudspeaker position 522. The closer the assumed loudspeaker position is to the actual loudspeaker position, the more influence the audio input channel has on the corresponding audio output channel.

In FIG. 5, f indicates an audio input channel for the loudspeaker at the assumed loudspeaker position 512. $g_1$ indicates a first audio output channel for the first actual loudspeaker at the first actual loudspeaker position 521, $g_2$ indicates a second audio output channel for the second actual loudspeaker at the second actual loudspeaker position 522, $\alpha$ indicates an azimuth angle and $\beta$ indicates an elevation angle, wherein the azimuth angle $\alpha$ and the elevation angle $\beta$, for example, indicate a direction from an actual loudspeaker position to an assumed loudspeaker position or vice versa.

In an embodiment, each audio input channel of the three or more audio input channels may be assigned to an assumed loudspeaker position of the first group of three or more assumed loudspeaker positions. For example, when it is assumed that an audio input channel will be played back by a loudspeaker at an assumed loudspeaker position, then this audio input channel is assigned to that assumed loudspeaker position. Each audio output channel of the two or more audio output channels may be assigned to an actual loudspeaker position of the second group of two or more actual loudspeaker positions. For example, when an audio output channel shall be played back by a loudspeaker at an actual loudspeaker position, then this audio output channel is assigned to that actual loudspeaker position. The downmixer may be configured to generate each audio output channel of the two or more audio output channels depending on at least two of the three or more audio input channels, depending on the assumed loudspeaker position of each of said at least two of the three or more audio input channels and depending on the actual loudspeaker position of said audio output channel.

Figure 6:
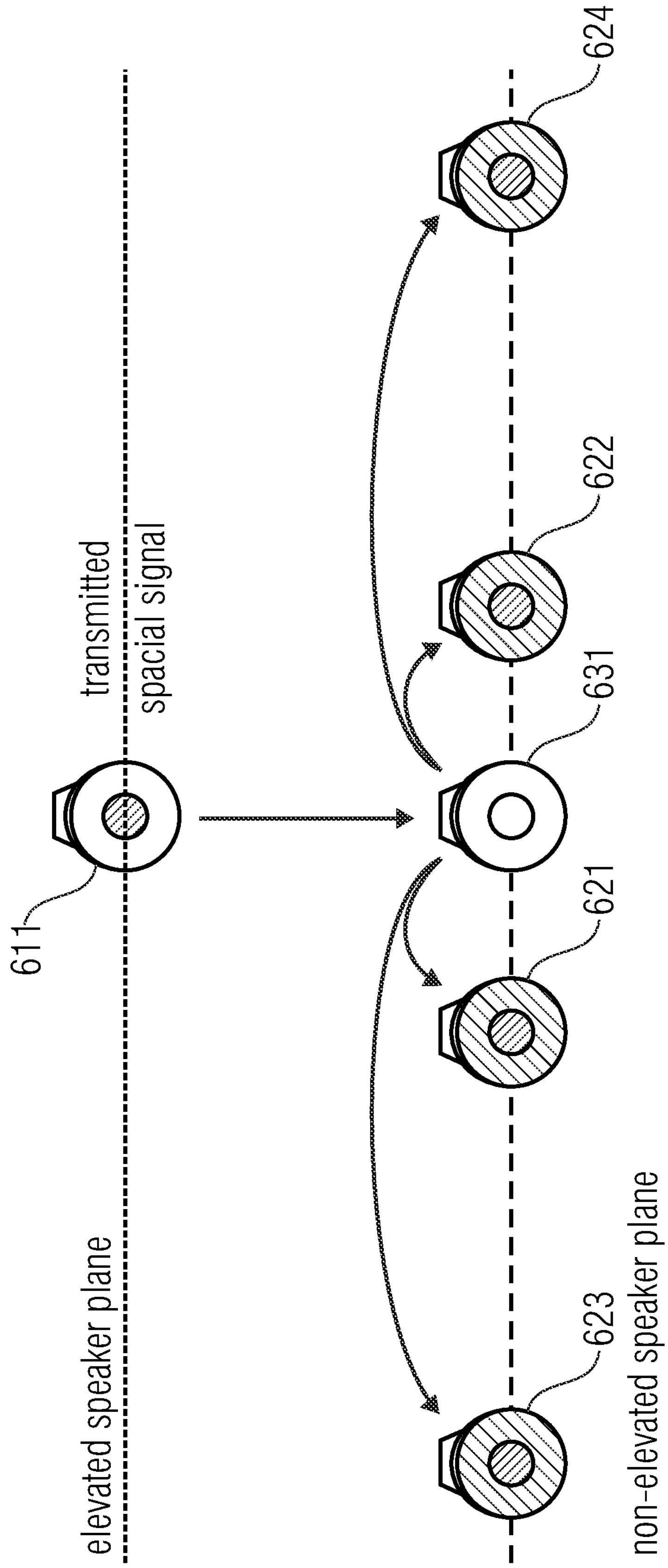
FIG. 6 illustrates a mapping of elevated spatial signals to other elevation levels.

FIG. 6 illustrates a mapping of elevated spatial signals to other elevation levels. The transmitted spatial signals (channels) are either channels for speakers in an elevated speaker plane or for speakers in a non-elevated speaker plane. If all real loudspeakers are located in a single loudspeaker plane (a non-elevated speaker plane), the channels for speakers in the elevated speaker plane have to be fed into speakers of the non-elevated speaker plane.

For this purpose, the side information comprises the information on the assumed loudspeaker position 611 of a speaker in the elevated speaker plane. A corresponding virtual position 631 in the non-elevated speaker plane is determined by the downmixer and modified audio channels generated by modifying the audio input channel for the assumed elevated speaker are generated depending on the actual loudspeaker positions 621, 622, 623, 624 of the actually available speakers.

Frequency selectivity may by employed for achieving a finer control of the downmixing. Using the example of “amount of ambience”, a height channel might comprise both spatial components and direct components. Frequency components having different properties may be characterized accordingly.

According to an embodiment, each of the three or more audio input channels comprises an audio signal of an audio object of three or more audio objects. The side information comprises, for each audio object of the three or more audio objects, an audio object position indicating a position of said audio object. The downmixer is configured to downmix the three or more audio input channels depending on the audio object position of each of the three or more audio objects to obtain the two or more audio output channels.

For example, the first audio input channel comprises an audio signal of a first audio object. A first loudspeaker may be located at a first actual loudspeaker position. A second loudspeaker may be located at a second actual loudspeaker position. The distance between the first actual loudspeaker position and the position of the first audio object may be smaller than the distance between the second actual loudspeaker position and the position of the first audio object. Then, a first audio output channel for the first loudspeaker and a second audio output channel for the second loudspeaker is generated, such that the audio signal of the first audio object has a greater influence in the first audio output channel than in the second audio output channel.

For example, a first weight and a second weight may be generated. The first weight may depend on the distance between the first actual loudspeaker position and the position of the first audio object. The second weight may depend on the distance between the second actual loudspeaker position and the position of the second audio object. The first weight is greater than the second weight. For generating the first audio output channel, the first weight may be applied on the audio signal of the first audio object to generate a first modified audio channel. For generating the second audio output channel, the second weight may be applied on the audio signal of the first audio object to generate a second modified audio channel. Further modified audio channels may similarly be generated for the other audio output channels and/or for the other audio objects, respectively. Each audio output channel of the two or more audio output channels may be generated by combining its modified audio channels.

Figure 8:
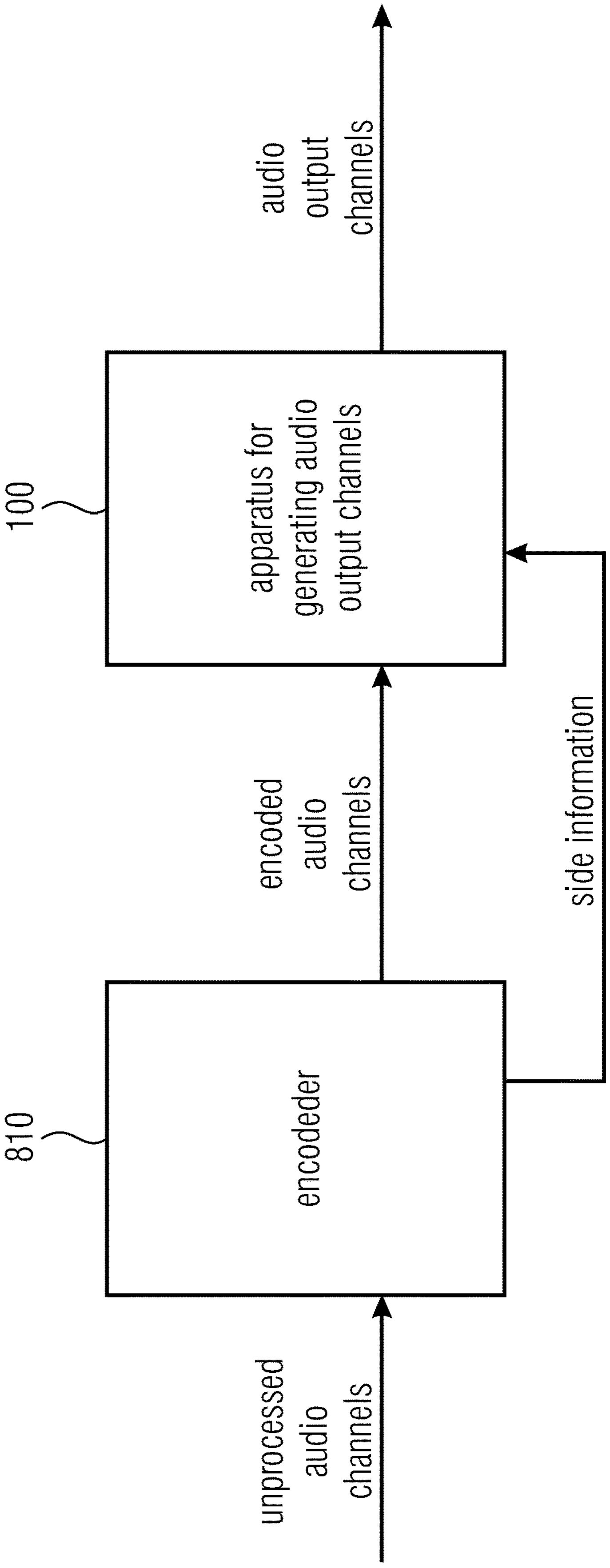
FIG. 8 illustrates a system according to an embodiment.

FIG. 8 illustrates a system according to an embodiment.

The system comprises an encoder 810 for encoding three or more unprocessed audio channels to obtain three or more encoded audio channels, and for encoding additional information on the three or more unprocessed audio channels to obtain side information.

Furthermore, the system comprises an apparatus 100 according to one of the above-described embodiments for receiving the three or more encoded audio channels as three or more audio input channels, for receiving the side information, and for generating, depending on the side information, two or more audio output channels from the three or more audio input channels.

Figure 9:
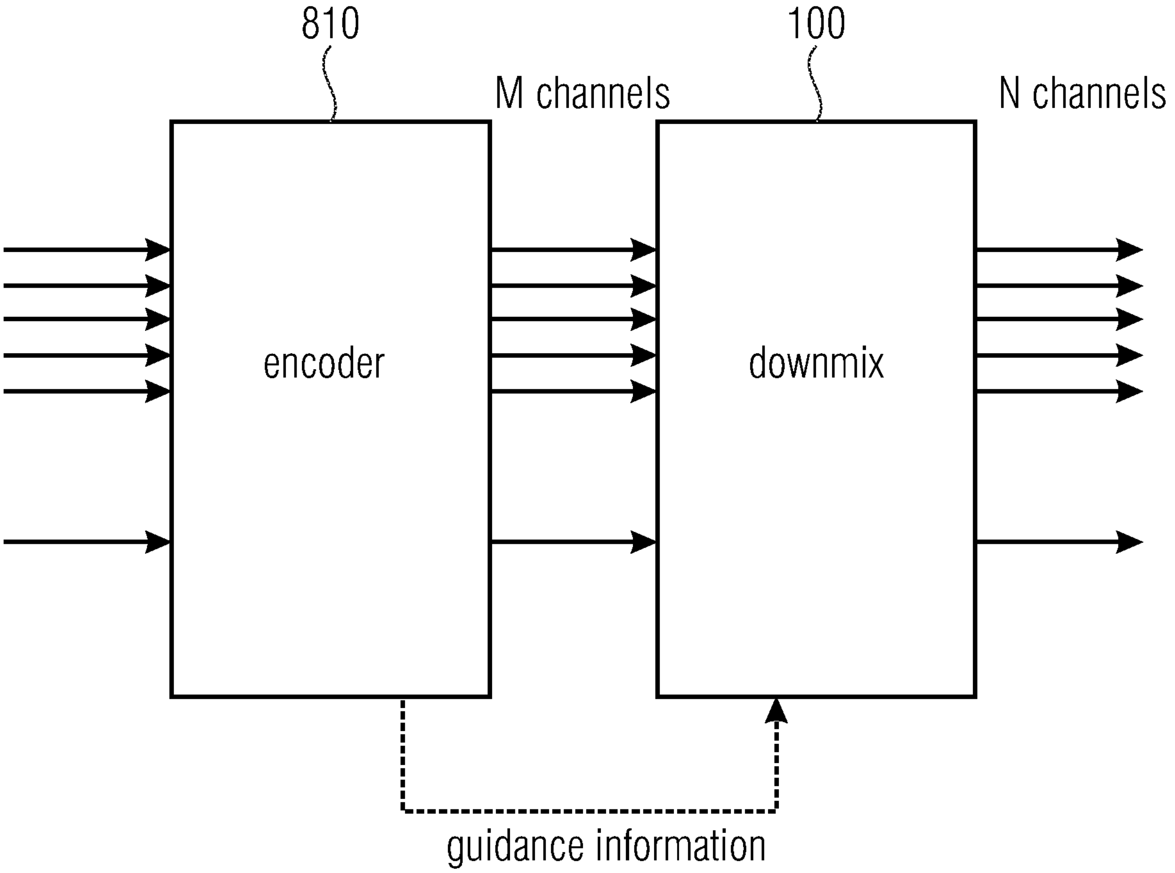
FIG. 9 is another illustration of a system according to an embodiment.

FIG. 9 illustrates another illustration of a system according to an embodiment. The depicted guidance information is side information. The M encoded audio channels, encoded by the encoder 810, are fed into the apparatus 100 (indicated by "downmix") for generating the two or more audio output channels. N audio output channels are generated by downmixing the M encoded audio channels (the audio input channels of the apparatus 820). In an embodiment, $N<M$ applies.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

The inventive decomposed signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LITERATURE

[1] J. M. Eargle: Stereo/Mono Disc Compatibility: A Survey of the Problems, 35th AES Convention, October 1968
[2] P. Schreiber: Four Channels and Compatibility, J. Audio Eng. Soc., Vol. 19, Issue 4, April 1971 (2)
[3] D. Griesinger: Surround from stereo, Workshop #12, 115th AES Convention, 2003

[4] E. C, Cherry (1953): Some experiments on the recognition of speech, with one and with two ears, Journal of the Acoustical Society of America 25, 975979

[5] ITU-R Recommendation BS.775-1 Multi-channel Stereophonic Sound System with or without Accompanying Picture, International Telecommunications Union, Geneva, Switzerland, 1992-1994

[6] D. Griesinger: Progress in 5-2-5 Matrix Systems, 103rd AES Convention, September 1997

[7] J. Hull: Surround sound past, present, and future, Dolby Laboratories, 1999, www.dolby.com/tech/

[8] C. Faller, F. Baumgarte: Binaural Cue Coding Applied to Stereo and Multi-Channel Audio Compression, 112th AES Convention, Munich 2002

[9] C. Faller, F. Baumgarte: Binaural Cue Coding Part II: Schemes and Applications, IEEE Trans. Speech and Audio Proc., vol. 11, no. 6, pp. 520-531, November 2003

[10] J. Breebaart, J. Herre, C. Faller, J. Rdn, F. Myburg, S. Disch, H. Purnhagen, G. Hotho, M. Neusinger, K. Kjrling, W. Oomen: MPEG Spatial Audio Coding/MPEG Surround: Overview and Current Status, 119$^{th}$ AES Convention, October 2005.

[11] ISO/IEC 14496-3, Chapter 4.5.1.2.2

[12] B. Runow, J. Deigmöller: Optimierter Stereo—Downmix von 5.1-Mehrkanalproduktionen (An optimized Stereo Downmix of a multichannel audio production), 25. Tonmeistertagung—VDT international convention, November 2008

[13] J. Thompson, A. Warner, B. Smith: An Active Multichannel Downmix Enhancement for Minimizing Spatial and Spectral Distortions, 127 AES Convention, October 2009

[14] C. Faller: Multiple-Loudspeaker Playback of Stereo Signals. JAES Volume 54 Issue 11 pp. 1051-1064; November 2006

[15] AVENDANO, Carlos u. JOT, Jean-Marc: Ambience Extraction and Synthesis from Stereo Signals for Multi-Channel Audio Mix-Up. In: Proc. or IEEE Internat. Conf. on Acoustics, Speech and Signal Processing (ICASSP), May 2002

[16] U.S. Pat. No. 7,412,380 B1: Ambience extraction and modification for enhancement and upmix of audio signals

[17] U.S. Pat. No. 7,567,845 B1: Ambience generation for stereo signals

[18] US 2009/0092258 A1: CORRELATION-BASED METHOD FOR AMBIENCE EXTRACTION FROM TWO-CHANNEL AUDIO SIGNALS

[19] US 2010/0030563 A1: Uhle, Walther, Herre, Hellmuth, Janssen: APPARATUS AND METHOD FOR GENERATING AN AMBIENT SIGNAL FROM AN AUDIO SIGNAL, APPARATUS AND METHOD FOR DERIVING A MULTI-CHANNEL AUDIO SIGNAL FROM AN AUDIO SIGNAL AND COMPUTER PROGRAM

[20] J. Herre, H. Purnhagen, J. Breebaart, C. Faller, S. Disch, K. Kjörling, E. Schuijers, J. Hilpert, and F. Myburg, The Reference Model Architecture for MPEG Spatial Audio Coding, presented at the 118th Convention of the Audio Engineering Society, J. Audio Eng. Soc. (Abstracts), vol. 53, pp. 693, 694 (2005 July/August), convention paper 6447

[21] Ville Pulkki: Spatial Sound Reproduction with Directional Audio Coding. JAES Volume 55 Issue 6 pp. 503-516; June 2007

[22] ETSI TS 101 154, Chapter C

[23] MPEG-4 downmix metadata

[24] DVB downmix metadata

The invention claimed is:

1. An apparatus for generating two or more audio output channels from three or more audio input channels, wherein the apparatus comprises:

a receiving interface for receiving the three or more audio input channels, and a downmixer for downmixing the three or more audio input channels using a weight for each audio input channel to obtain the two or more audio output channels, wherein the number of the audio output channels is smaller than the number of the audio input channels, wherein the downmixer is configured to determine the weight for each audio input channel, wherein the apparatus is configured to feed each of the two or more audio output channels into a loudspeaker of a group of two or more loudspeakers, wherein the downmixer is configured to downmix the three or more audio input channels depending on each assumed loudspeaker position of a first group of three or more assumed loudspeaker positions and depending on each actual loudspeaker position of a second group of two or more actual loudspeaker positions to obtain the two or more audio output channels, wherein the downmixer is configured to generate an audio output channel of the two or more audio output channels depending on at least two audio input channels of the three or more audio input channels, depending on an assumed loudspeaker position of each of said at least two audio input channels and depending on an actual loudspeaker position of said audio output channel, and wherein the downmixer is configured to downmix the three or more audio input channels depending on an amount of ambience of each of the three or more audio input channels to obtain the two or more audio output channels.

2. An apparatus according to claim 1, wherein the downmixer is configured to generate each audio output channel of the two or more audio output channels by modifying at least two audio input channels of the three or more audio input channels depending on side information to acquire a group of modified audio channels, and by combining each modified audio channel of said group of modified audio channels to acquire said audio output channel.

3. An apparatus according to claim 2, wherein the downmixer is configured to generate each audio output channel of the two or more audio output channels by modifying each audio input channel of the three or more audio input channels depending on the side information to acquire the group of modified audio channels, and by combining each modified audio channel of said group of modified audio channels to acquire said audio output channel.

4. An apparatus according to claim 2, wherein the downmixer is configured to generate each audio output channel of the two or more audio output channels by generating each modified audio channel of the group of modified audio channels by determining a weight depending on an audio input channel of the one or more audio input channels and depending on the side information and by applying said weight on said audio input channel.

5. An apparatus according to claim 1, wherein side information indicates the amount of ambience of each of the three or more audio input channels.

6. An apparatus according to claim 1, wherein side information indicates a diffuseness of each of the three or more audio input channels or a directivity of each of the three or more audio input channels, and wherein the downmixer is configured to downmix the three or more audio input channels depending on the diffuseness of each of the three or more audio input channels or depending on the directivity of each of the three or more audio input channels to acquire the two or more audio output channels.

7. An apparatus according to claim 1, wherein side information indicates a direction of arrival of the sound, and wherein the downmixer is configured to downmix the three or more audio input channels depending on the direction of arrival of the sound to acquire the two or more audio output channels.

8. An apparatus according to claim 1, wherein each of the two or more audio output channels is a loudspeaker channel for steering a loudspeaker.

9. An apparatus according to claim 1, wherein the apparatus is configured to feed each of the two or more audio output channels into a loudspeaker of a group of two or more loudspeakers, wherein the downmixer is configured to downmix the three or more audio input channels depending on each assumed loudspeaker position of a first group of three or more assumed loudspeaker positions and depending on each actual loudspeaker position of a second group of two or more actual loudspeaker positions to acquire the two or more audio output channels, wherein each actual loudspeaker position of the second group of two or more actual loudspeaker positions indicates a position of a loudspeaker of the group of two or more loudspeakers.

10. An apparatus according to claim 9, wherein each audio input channel of the three or more audio input channels is assigned to an assumed loudspeaker position of the first group of three or more assumed loudspeaker positions, wherein each audio output channel of the two or more audio output channels is assigned to an actual loudspeaker position of the second group of two or more actual loudspeaker positions, and wherein the downmixer is configured to generate each audio output channel of the two or more audio output channels depending on at least two of the three or more audio input channels, depending on the assumed loudspeaker position of each of said at least two of the three or more audio input channels and depending on the actual loudspeaker position of said audio output channel.

11. An apparatus according to claim 1, wherein each of the three or more audio input channels comprises an audio signal of an audio object of three or more audio objects, wherein side information comprises, for each audio object of the three or more audio objects, an audio object position indicating a position of said audio object, and wherein the downmixer is configured to downmix the three or more audio input channels depending on the audio object position of each of the three or more audio objects to acquire the two or more audio output channels.

12. An apparatus according to claim 1, wherein the downmixer is configured to downmix four or more audio input channels depending on side information to acquire three or more audio output channels.

13. A system comprising:

an encoder for encoding three or more unprocessed audio channels to acquire three or more encoded audio channels, and for encoding additional information on the three or more unprocessed audio channels to acquire side information, and an apparatus according to claim 1 for receiving the three or more encoded audio channels as three or more audio input channels, for receiving the side information, and for generating, depending on the side information, two or more audio output channels from the three or more audio input channels.

14. A method for generating two or more audio output channels from three or more audio input channels, wherein the method comprises:

receiving the three or more audio input channels, and downmixing the three or more audio input channels using a weight for each audio input channel to obtain the two or more audio output channels, wherein the number of the audio output channels is smaller than the number of the audio input channels, and wherein the weight is determined for each audio input channel, wherein each of the two or more audio output channels is fed into a loudspeaker of a group of two or more loudspeakers, wherein downmixing the three or more audio input channels is conducted depending on each assumed loudspeaker position of a first group of three or more assumed loudspeaker positions and depending on each actual loudspeaker position of a second group of two or more actual loudspeaker positions to obtain the two or more audio output channels, wherein the method includes generating an audio output channel of the two or more audio output channels depending on at least two audio input channels of the three or more audio input channels, depending on an assumed loudspeaker position of each of said at least two audio input channels and depending on an actual loudspeaker position of said audio output channel, and wherein downmixing the three or more audio input channels is conducted depending on an amount of ambience of each of the three or more audio input channels to obtain the two or more audio output channels.

15. A non-transitory computer readable medium including a computer program for implementing the method of claim 14 when being executed on a computer or signal processor.

* * * * *